United States Patent [19]

Foster et al.

[11] 4,143,751

[45] Mar. 13, 1979

[54] CIRCULAR SORTATION APPARATUS AND METHODS

[75] Inventors: Lloyd L. Foster, LaGrange, Ky.; Gary D. Gaarder, Grand Blanc, Mich.; Charles E. Venzke, New Berlin, Wis.

[73] Assignee: A-T-O Inc., Willoughby, Ohio

[21] Appl. No.: 823,968

[22] Filed: Aug. 12, 1977

[51] Int. Cl.² ............................................. B65G 47/46
[52] U.S. Cl. ................................. 198/365; 198/796; 198/802; 198/803
[58] Field of Search ............... 198/365, 370, 478, 482, 198/796, 802, 803; 214/11 R

[56] References Cited

U.S. PATENT DOCUMENTS

| | | | |
|---|---|---|---|
| 3,347,369 | 10/1967 | Conlon | 198/803 |
| 3,417,976 | 12/1968 | Cunningham | 198/803 |
| 3,510,014 | 5/1970 | Speaker et al. | 198/796 |
| 3,606,045 | 9/1971 | Abromavage et al. | 198/365 |
| 3,623,599 | 11/1971 | Tillman | 198/803 |
| 3,750,879 | 8/1973 | Luckett et al. | 198/365 |

*Primary Examiner*—Joseph E. Valenza
*Attorney, Agent, or Firm*—Wood, Herron & Evans

[57] ABSTRACT

An improved circular sorter includes an integral, rotatable, circular ring on which tiltable tray carriages are mounted. The ring is driven by a peripheral drive to convey the tiltable trays past loading stations, where articles are placed thereon, and then to sort locations where articles are selectively discharged by tray tilting, to either the inside or outside of the ring. Both loading and sort locations can be disposed interiorly or exteriorly of the ring. Yieldable rollers support the ring and operatively accommodate variations in vertical disposition, while a combination of fixed and yieldable rollers guide the ring in a horizontal path and accommodate ring pitch inaccuracies.

14 Claims, 9 Drawing Figures

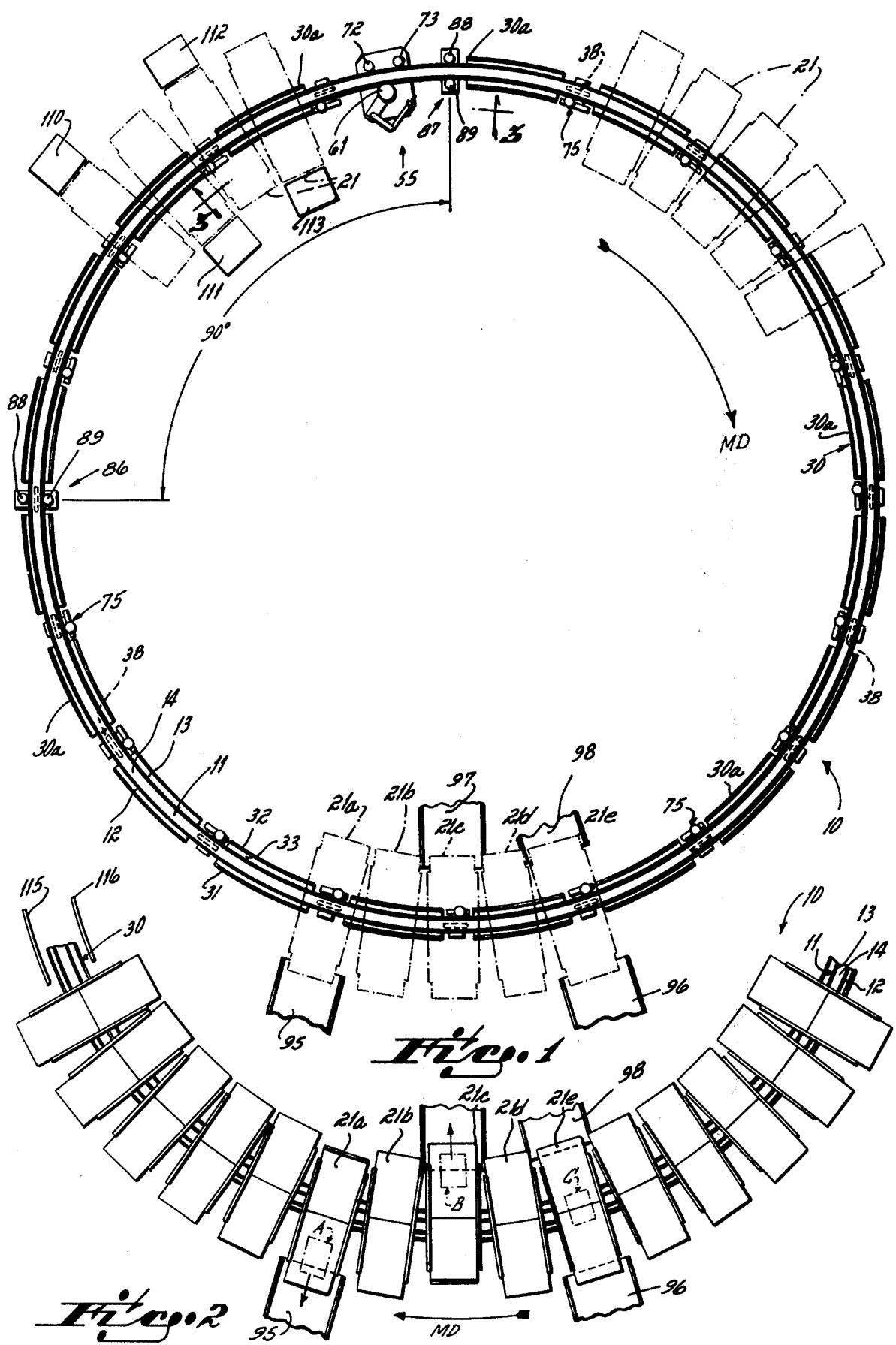

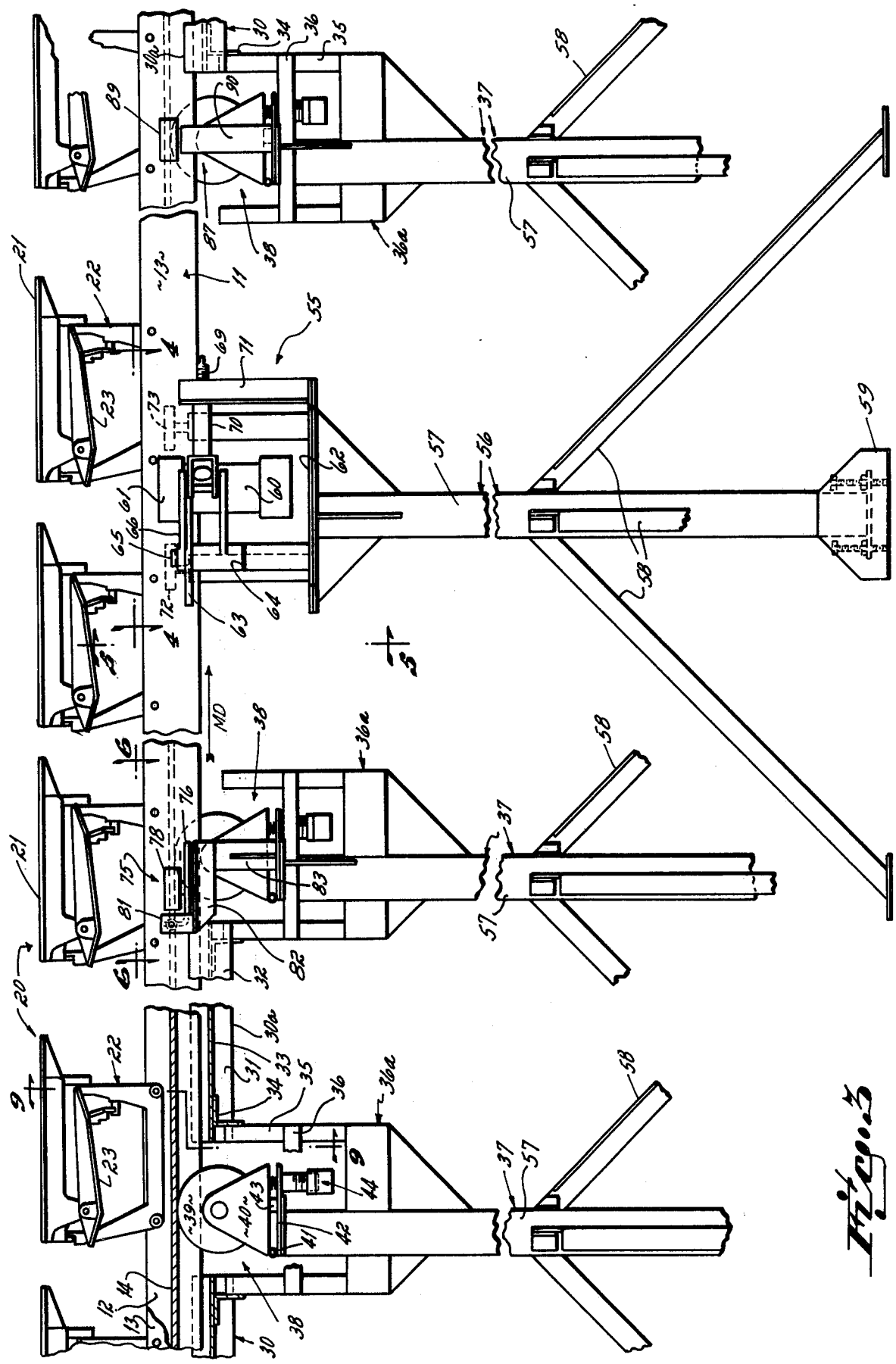

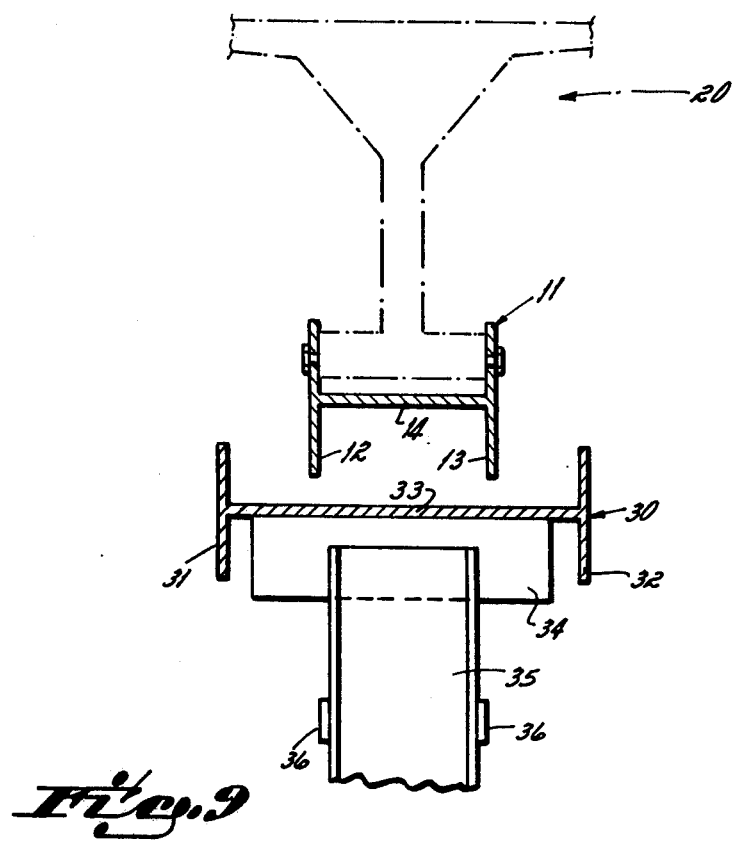

CIRCULAR SORTATION APPARATUS AND METHODS

This invention relates to article sortation apparatus and particularly to circular article sortation apparatus.

Article sortation apparatus of the type utilizing a plurality of moving, tiltable trays for receiving articles to be sorted and thereafter tilting to discharge an article in a selected position are well known. For example, U.S. Pat. No. 3,510,014 discloses a conveyor system utilizing a train of tiltable trays, each mounted on a respective carriage which is linked to following and preceding carriages by a flexible chain. The chain is driven to pull the carriages past loading and receiving stations where articles are respectively loaded onto the trays, and are then selectively discharged by the supporting tray's tilting toward an appropriate receiving station. Such sortation apparatus has typically been referred to in the past as a "carrousel sorter," due in part to the fact that the carriages are linked by the chain in a closed loop.

Such chain driven carrousel sorters are not particularly well suited to applications where the total peripheral distance traversed by the trays is small. One of the major impediments to practical utilization of a known carrousel sorter in a small system is that the sorter apparatus occupies a substantial amount of space within the sorter's periphery. This diminishes the available space for sort locations, i.e., article receiving stations.

Particularly, since the carriages are connected and driven by an endless loop flexible chain, it is generally necessary to provide a chain take-up, normally comprising a large sprocket interiorly of the loop and elongated chain guides. Also, a drive mechanism is typically located interiorly of the loop, along with large turn sprockets or the like. The take-up and drive mechanisms, when combined with the tight turns necessary in a 60-foot diameter system, significantly reduce the available total number of sort locations (article receiving stations) since sort locations cannot advantageously be adapted to the small space areas at the take-up, drive, and turn areas.

Also, a circular configuration, particularly in the 10 to 60 foot range, is normally not feasible due to the necessity of a drive chain take-up. In use, the take-up pushes outwardly of the chain loop, resulting in an egg or elliptical shape as opposed to a circle.

It has also been known in the past to provide a movable hub circular sorter comprising a driven hub, arms radially extending from the hub, and tiltable tray carriages mounted at the ends of the arms for motion in a circular path. This movable hub sorter configuration has several limitations. First, it is limited by the load capacity of the radial drive arms. Secondly, in longer systems, as for example systems 25 or more feet in diameter, a carrousel sorter of an identical number of sort locations generally offer cost advantages. Even more importantly, such radial arm circular sorters are not feasible for sortation interiorly of the circular path of the trays, due to the intervening arms.

One object of this invention has thus been to provide an improved sortation apparatus of the type which follows a circular flow path but one which offers significant cost, installation, and operating advantages over prior carrousel or movable hub type circular sorter systems. The invention of this application offers such advantages, particularly in smaller size systems or systems which operate in tight areas or in congested facilities.

A further objective of this invention has been to provide an improved sorter of the circular flow path type which is capable of sorting both interiorly and exteriorly of the circular path traversed by the article trays.

A further objective of the invention has been to provide an improved circular sorter which can be adapted to sortation systems having circular sortation paths from about 10 feet in diameter to about 60 feet in diameter and more, and which can sort both interiorly and exteriorly of the circular path.

A further objective of the invention has been to provide improved methods and apparatus for article sortation.

To these ends, a preferred embodiment of the invention comprises a driven circular ring, mounted for rotation in the plane of the ring, and tiltable article supporting tray assemblies mounted on the ring for circular movement therewith, the trays being selectively tiltable interiorly or exteriorly of the ring to discharge articles thereon into receiving bins or stations at predetermined sort locations on either side of the ring. Spring loaded rollers are provided beneath the ring to support it for rotation and to accommodate vertical variations in the plane of the ring.

In one preferred embodiment, other spring loaded rollers are located adjacent the ring to guide it in a substantially circular path and to accommodate inaccuracies in the pitch radius of the ring. Also, at two points about the ring, preferably at 90° orientation, fixed rollers are mounted to engage the ring and to positively guide it in a constant path therethrough and about substantially the same center point.

A stationary frame is preferably located beneath and adjacent the movable ring to provide support for tip-up assemblies, operable to tilt the trays interiorly or exteriorly of the ring at sortation locations. Coding and tipping of the trays at selected sort locations is accomplished as described in the aforementioned U.S. Pat. No. 3,510,014.

A plurality of sort locations are disposed about the ring, inside and outside thereof, the inside area or interior of the ring being free of arms, large drive sprockets or large chain take-up mechanisms. While the ring drive is located interiorly of the ring, it preferably comprises an hydraulically driven wheel, about 6 inches in diameter, yieldingly biased against the internal circumferential surface of the ring. The drive thus occupies an insignificant area of space within the ring and does not itself effectively limit the number of sort locations within the ring, even in small diameter installations of 10 feet, for example. Each sort location may include a chute, bin, conveyor, or other suitable means for receiving a sorted aritcle, selectively discharged from a tilting tray.

Loading of the passing sorter trays is accomplished by hand, contemporaneously with coding, or by any other suitable method. This loading may also be carried out at one or more loading stations located exteriorly or interiorly of the ring.

Such an improved circular sortation apparatus has many advantages, particularly in the smaller size systems, as for example, systems in 10–60 foot diameter sizes. For example, a normal carrousel sortation system providing in the range of 50-100 sort locations currently costs over three and one-half times as much as an improved 90-sort location circular sorter constructed according to the practice of this invention. Since the improved circular sorter of this invention has no interior structure of significant bulk, sort and loading stations can be located on both sides of the ring providing a high density of sort and loading locations within a small space, and the sorter can be used in many existing structures, where previous circular sorters could not heretofore be used, as for example, when the flow path circumscribed supporting columns, machinery, or other items.

Another significant advantage of this invention over prior circular and carrousel sorters is its relatively low operational noise level. Due in part to the elimination of the drive chain and carriage wheels of the typical carrousel sorter, and to the elimination of bulky interior moving parts of conventional moving hub circular sorters, the improved sorter of this invention is extremely quiet, a highly desirable feature in a warehousing, storing and sorting facility attended by human operators.

These and other advantages will become readily apparent from the following detailed description of a preferred embodiment of the invention and from the drawings in which:

FIG. 1 is a diagrammatic plan view of a circular sorter according to the invention;

FIG. 2 is an illustrative plan view of a portion of a circular sorter according to the invention;

FIG. 3 is a broken elevational view of a circular sorter as in FIGS. 1 and 2, and taken on line 3—3 of FIG. 1;

FIG. 9 is a cross-sectional view taken along lines 9—9 of FIG. 3.

Figure 4:
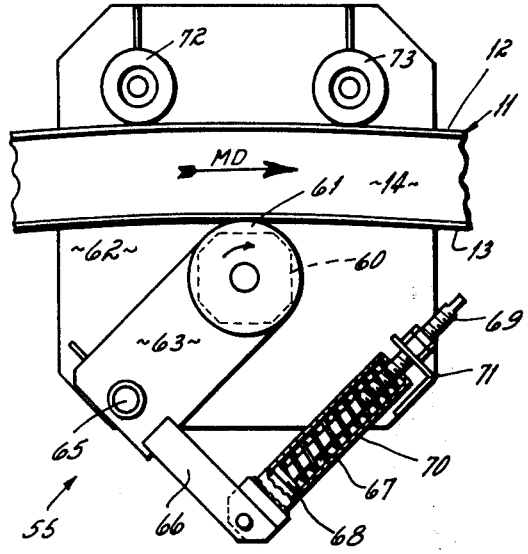
FIG. 4 is a plan view of the circular sorter drive taken along lines 4—4 of FIG. 3.
Figure 5:
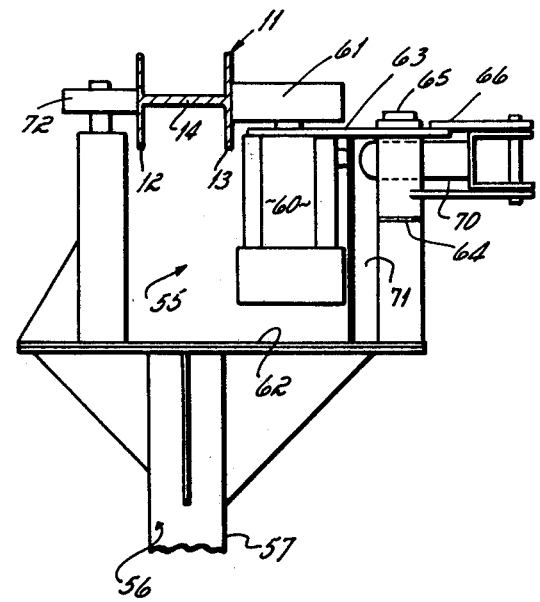
FIG. 5 is an elevational view of the circular sorter drive taken along lines 5—5 of FIG. 3.

Turning now to the drawings there is shown in FIG. 1 thereof an improved circular sorter 10 according to the invention. The sorter includes an integral continuous circular ring 11 in the form of a curved H-beam having vertical side flanges 12 and 13, and a web 14. While the ring 11 is defined as being continuous, it is preferably made from a plurality of rolled H-beams joined together at joints (not shown) to form the continuous ring 11.

As shown in FIGS. 1, 2, 8 and 9, a plurality of tray assemblies 20 are mounted to the ring 11. Each tray assembly comprises a tray 21 mounted on a carriage 22. The tray and carriage may be of the type such as those shown in U.S. Pat. No. 3,510,014 or in U.S. Pat. No. 3,034,665. It should be noted, however, that unlike the structures of those patents, and as shown in FIG. 9, each carriage 22 is mounted directly to the ring 11 by appropriate bolts or screws so that the ring and the plurality of carriages form essentially an integral element.

As shown in the aforesaid U.S. patents, each carriage is provided with cam levers 23, one pivoted to each side of the carriage and each being connected to a tray latch. When pivoted, as will be described, either of the cam levers release the latch and permit the tray to be tilted. One form of suitable latch mechanism is shown in U.S. Pat. No. 3,510,014.

The circular sorter further includes a stationary circular frame 30 comprising a ring of rolled frame beams or segments 30a having outside flange 31, inside flange 32 and web 33. The segments of stationary frame 30 are of greater web width than the ring 11 and underlie and partially surround ring 11. While the segments are discontinuous at the sorter support apparatus as will be discussed, they comprise, together with appropriate connecting structure, such as web engaging bracket 34, upright frame columns 35 and frame braces 36, all mounted on support structure or brackets 36a, a continuous circular frame 30. The discontinuity of the H-beam segments of frame 30 is clearly shown in FIG. 1 and in FIG. 3.

The ring 11 is supported for rotational movement in a substantially circular path about an imaginary center point by a plurality of supports 37, as shown in FIG. 3. The supports are located at distances corresponding to those required for the particular diameter of circular sorter provided, and thus the particular weight of the structure. Supports 37 are diagrammatically shown spaced about and beneath the ring 11 in FIG. 1. It will be appreciated that the supports are tied together through connecting structures 34, 35 and 36 and the rolled H-beam segments of frame 30.

In the manufacture of the ring 11, a plurality of H-beams of selected size are rolled to form an arcuate segment of the circle. Thereafter, the H-beams are connected end to end on a biased connection to form the continuous and integral ring 11. In such a rolling or forming operation, it is known that the H-beam ring provided will generally not reside in a flat plane, but rather the rolled H-beam will have variations or vertical inaccuracies therein. Due to these variations, when the ring 11 is placed on the plurality of rollers having upper surfaces in the same plane, portions of the circular ring will touch the rollers while other portions will lift above the rollers and will not be supported.

Figure 7:
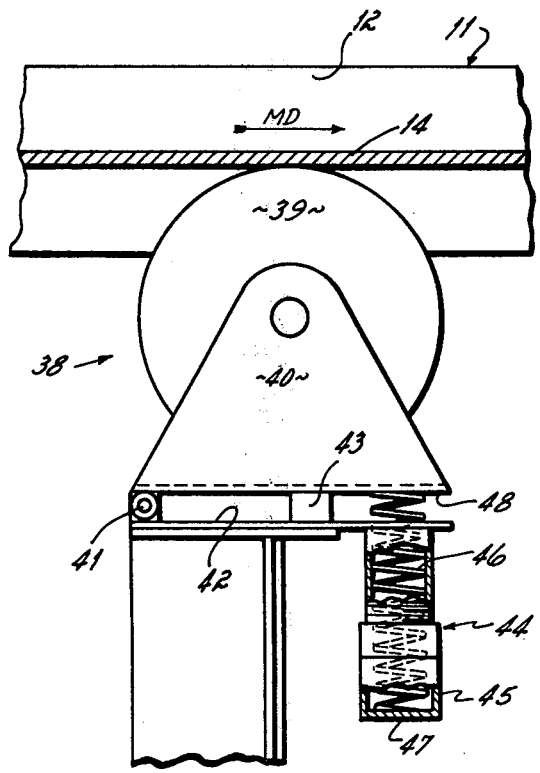
FIG. 7 is an elevational view showing details of the circular sorter ring support.

In order to provide continuous support of the ring 11 at each support location, each support is outfitted at the upper end thereof with a biased support roller assembly 38, the details of which are clearly shown in FIGS. 3 and 7. Referring to FIG. 7, a spring-biased roller support assembly 38 includes a urethane-covered roller 39 and a bracket 40. The bracket is pivoted at the pivot point 41 for rotation of the bracket in clockwise and counterclockwise directions about point 41, as viewed in FIG. 7. The top of each support is provided with a plate member 42 which in turn is provided with a bumper 43 underlying and normally supporting the bracket 40. An adjustable spring biasing assembly, comprising a spring housing 44, a threaded adjustable cap 45 and a spring 46 residing therein and maintained between the bottom 47 of the cap 45 and the outer end 48 of the bracket 40 is located on the other side of the bumper 43 from the pivot point 41.

In use, the supports 37, with the roller assemblies 38, are disposed in a predetermined circular position. The frame structure, comprising frame elements 34, 35, 36 and segments 30a, and the rings 11, together with the carriages 22 are mounted thereon.

The spring-bias for each of the roller assemblies 38 is adjusted so that the rollers are all contacting the web 14 of the ring 11. More particularly, the adjustment of each spring is selected such that when the ring 11 is in a normal position, such as shown in FIG. 7, the web 14 of the ring 11 will ride on the roller 39 and the spring-biased bracket 40 will rest on the bumper 43. The combined weight of the ring 11 and the carriages 22 normally maintains the bracket against the bumper and against the pressure or bias of the spring 46. As the ring 11 is rotated, however, inaccuracies resulting from the rolling operation of the ring segments may tend to cause the ring at a particular support 37 to lift off the associated roller 39. Due to the adjusted compression, however, of the spring 46, the bracket 40 is biased upwardly to maintain the roller 39 in supporting relationship with the web 14 of the ring 11. Preferably, the vertical stroke of roller 39 extends through an effective range of approximately ⅜ of an inch. That is to say, that the bracket 40 may move the rollers through a vertical stroke of ⅜ inch in which stroke the rate of spring 46 is operable to urge the bracket 40 upwardly and to provide significant support to the web 14 of the ring 11. Thus, it is apparent that each spring 46 is selected, and is adjusted by means of the cap 45, to provide significant support pressure beneath the ring 11 to accommodate vertical variations in the ring of approximately ⅜ inch although, of course, the variation of the ring may be more or less than ⅜ inch vertically and the spring 46 and its adjustment via the cap 45 may be selected accordingly.

In order to eliminate excessive vertical lifting of the ring above any support roller 39, capture bars or rollers (not shown) may be positioned at several points about the ring for engagement on the top of the flanges 12 or 13.

A drive assembly 55 is shown in detail in FIGS. 1-3, 4 and 5. As shown in FIG. 1, the assembly 55 is located just interiorly of the ring 11. With respect to the diameter of the circular sorter, however, the actual space taken up by the drive assembly is relatively insignificant.

The drive assembly 55 is mounted on an appropriate support 56 as shown in FIG. 3. The support 56, as does each support 37, includes an upright column 57, appropriate supporting braces 58, and an appropriate floor or other surface connector assembly 59. Each support is also provided with appropriate bracket or gusset structure 36a for connection to segments 30a via members 34, 35 and 36. Only the drive support 56 is shown in complete detail.

The drive preferably includes an hydraulic motor 60, driven through appropriate hydraulic connections to an hydraulic pump (not shown). Other suitable drive means, such as a gear motor or the like, could be used. The hydraulic motor 60 is connected to a drive wheel 61 which is spring biased against the internal flange 13 of the ring 11 as will now be described.

Essentially, the pivoted and spring biased drive assembly 55 is mounted on plate 62 supported by the support 56. The hydraulic motor is mounted to a pivoted member 63 which is connected via an appropriate bearing 64 to the plate 62, all to permit pivoting of the hydraulic motor 60 and the drive wheel 61 about pivot point or axis 65. Pivot arms 66 are attached in clevis form at one end to the pivoted member 63 and bearing 64. At the other ends, arms 66 are attached to a spring-biasing device including a compression spring 67 captured between the head 68 of bolt 69 and the bottom end of spring housing 70. The bolt 69 is threaded and is screwed into a bracket 71 which is attached to plate 62. From this description, it will be seen that rotation of the bolt 69 so as to draw a bolt head 68 toward the bracket 71 will compress the compression spring 67 and will tend to urge, through the pivot arms 66, pivoted member 63 about point 65. Accordingly, drive wheel 61 will be urged against the inner flange 13 of the ring 11.

In order to prevent the spring bias of the drive assembly from urging the ring outwardly from the imaginary center point of the circular sorter, backup rollers 72 and 73 are also mounted on the plate 62. These rollers engage the outer flange 12 of the ring 11 to prevent such movement.

It is also to be noted that the hydraulic motor 60 is operable to rotate the drive wheel 61 in a clockwise direction as viewed in FIGS. 1 and 4. Of course, if desired, the ring 11 could be driven in a counterclockwise direction. Accordingly, it will be seen that the combination of the pivoting drive assembly, and the rotation of the drive wheel 61, both tend to move the drive wheel 61 into positive driving engagement with the ring 11.

As a result of the forming operation of the ring 11, there may also be circular or pitch variations in the ring 11 within the horizontal plane. While, of course, expensive milling or forming operations could be utilized to eliminate both the vertical variations in the ring and the pitch variation in the ring, this invention provides means to accommodate both without the requirement for such an expensive milling operation. The ring 11 can thus be formed by the rolling of segments and the connecting thereof as has been described in a common manner despite the normal resulting inaccuracies.

Figure 6:
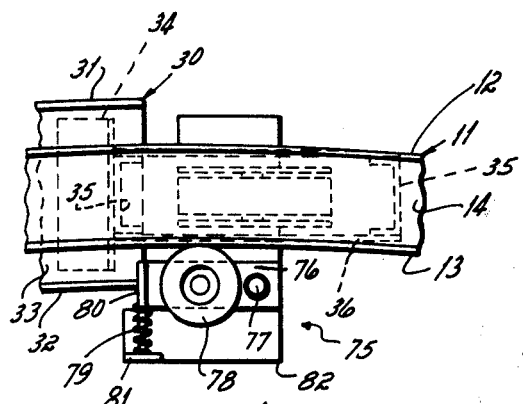
FIG. 6 is a plan view of the biased circular sorter ring guides taken along lines 6—6 of FIG. 3.

In order to accommodate pitch variations of the ring, there are provided interiorly thereof and on each support 37, except for two, a spring biased horizontal roller guide assembly 75, the details of which are shown in FIGS. 3 and 6. Each assembly 75 is mounted at the upper end of a support 37, interiorly of the ring 11, and each assembly 75 includes a pivot arm 76 mounted to pivot about pivot point or axis 77 and mounting thereon a guide roller 78. The assembly 75 includes a compression spring 79, mounted between an outer end 80 of the pivot arm 76 and stationary bracket 81, which is connected through an appropriate frame member to the upper end of the support column 57. As shown in FIG. 3, such an appropriate frame member takes the form of structural angle 82, mounted to vertical structural bracket 83, and secured in turn to the upper end of support column 57. Thus, the guide roller 78 is spring-biased against the inner flange 13 of the ring 11 to urge it in an outwardly direction. Since, however, almost all of the supports are provided with a similar spring urged guide roller 78, the ring is urged outwardly by all the springs in combination, some of which oppose others, and thereby tends to remain in its predetermined circular position. Of course, it should be appreciated that any form of spring loaded roller device could be utilized to accommodate the ring guiding function as described herein.

To insure that the ring will not translate significantly in a horizontal plane from about its imaginary center point, the ring is guided at two points by stationary opposed rollers which confine the ring to a constant path therebetween. As shown in FIG. 1, a stationary or fixed roller assembly 86 is spaced at 90° from another stationary or fixed roller assembly 87. Each of the stationary roller assemblies includes two fixed rollers 88 and 89, in combination forming a ring pinch point. Roller 88 engages the outer flange 12 of the ring 11 and roller 89 engages the inner flange 13 of the ring 11 to maintain the horizontal position of the ring at these two points or assemblies. The details of the stationary roller assembly are better seen in FIG. 3, where it is shown that the roller 89 is mounted via a roller shaft to a support 90 which is mounted to the upper end of one support column 57 in place of the spring loaded horizontal roller guide assembly 75.

Thus, via the combination of the stationary roller assemblies 86 and 87, and the spring biased horizontal roller guide assemblies 75, the ring is substantially maintained in a predetermined circular path, but yet accommodates inaccuracies in the ring pitch via the spring loaded guide assemblies 75. It should also be appreciated that the combination of the integral ring 11, together with the various support roller and guide roller assemblies, provides a circular sorter which has no significant space-taking or bulky internal apparatus. Thus, as shown in FIG. 1, the interior of the ring 11 is substantially free of any obstruction. The significance of this is seen in the following description of the sortation operation of the sorter as has been described.

The tipping operation of the trays, for sortation, is carried out as is specifically described in U.S. Pat. No. 3,510,014. The tipping apparatus adapted to the present invention is more particularly shown as tipping assembly 101 in FIG. 8. A plurality of tipping assemblies 101 are mounted on either side of ring 11 coinciding with the disposition of sort locations about ring 11 or either side thereof. Only one tipping assembly will be described.

Tipping assembly 101 is mounted via a gusset or bracket member 102 to the stationary support frame 30 and more specifically to the inner flange 32 of any segment 30a. Also mounted to the gusset 102 is a bumper 102a. In order to unlatch and tip the trays, a tip-up roller 103 is mounted on a pivot arm 104 which is pivoted to the bracket 105, in turn attached to the gusset 102. A solenoid controlled, air-operated cylinder 106 is also pivoted to the bracket 105 and is pivoted to the pivot arm 104 between the bracket 105 and the roller 103.

Figure 8:
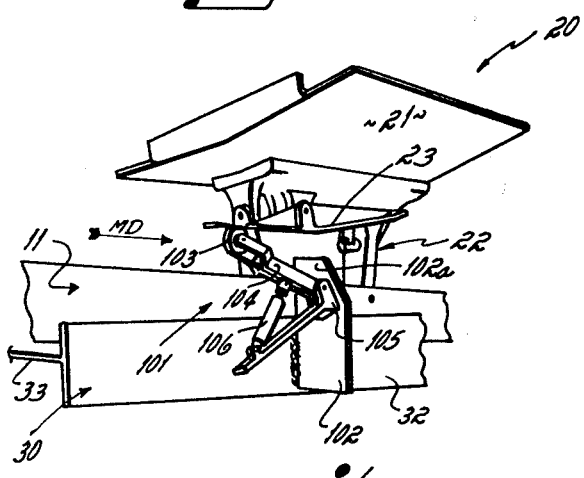
FIG. 8 is a perspective view showing the circular sorter ring, tray assembly, and tip-up assembly and mount of the invention.

Upon receipt of a code signal, the solenoid operates the air cylinder to raise the arm 104 in a substantially clockwise direction with a component of motion in the same direction as that of ring movement, as viewed in FIG. 8 (the position of arm 104 in FIG. 8 being in withdrawn non-engaging position). When the arm 104 is raised by the cylinder, the roller 103 is placed directly in the path of a cam lever 23 on the carriage 22, the arm 104 resting against the bumper 102a on the gusset 102. Initial engagement of the roller 103 with the cam lever 23 serves to pivot the cam lever to unlatch the cam assembly. Thereafter continued engagement of the cam lever 23 with the roller serves to pivot the tray to the opposite side of the ring 11 on which the tip-up assembly 101 is located. Accordingly, as viewed in FIG. 8, if the tip-up assembly were actuated, the tray 21 moving in the machine direction would have been released and tipped toward the exterior of the circle in order to deposit an article thereon into the selected sort location. As previously indicated, more details of the tip-up assembly and its engagement with the carriage together with the operation of the tipping carriage and tray, are particularly described in U.S. Pat. No. 3,510,014 which is incorporated herein by reference.

Returning to FIG. 1 and to the 6 o'clock position, a plurality of trays 21a through 21e are diagrammatically shown in phantom. FIG. 2 also shows these and other trays in respective tipped and non-tipped solid lines. As shown in both FIGS. 1 and 2, a plurality of sort locations can be provided both interiorly or exteriorly of the ring 11. For example, sort locations 95 and 96 are exterior of the ring 11, while sort locations 97 and 98 are interior of the ring 11. Each sort location comprises a receiving station which may be a bin, chute, conveyor, or other article receiving apparatus. The article receiving apparatus is generally located beneath the level of the tray 21. Thus, when the tray is tipped, the tipping is operable to discharge an article on the tray onto the receiving apparatus in the directions of the arrows as shown in connection with trays 21a and 21c in FIG. 2. Actual tipping of the trays toward the various sort locations is illustrated in FIG. 2. For example, as the ring 11 is driven in a clockwise machine direction, as indicated by the arrow MD throughout the figures, the various trays 21 are driven past the respective sort locations. Tray 21a is tipped exteriorly or to the outside of the ring 11 to deposit an article A thereon onto a chute 95. Tray 21c has also been tipped, however, this tray has been tipped to deposit an article B toward a sort location 97 interiorly or inside of the ring 11. Finally, it can be seen that tray 21e supports an article C which is traversing sort locations 96 and 98. Since the apparatus has not been coded to discharge article C to sort location 96 or 98, tray 21e remains horizontal and is not tipped.

It will be appreciated that articles can be loaded onto appropriate trays 21 at loading areas, such as at loading stations 110, 111, 112 and 113 located exteriorly (110 and 112) or interiorly (111 and 113) of the ring 11 as specifically shown in FIG. 1. After an article is loaded on a tray at a loading station by any appropriate means, and the appropriate coding is performed, the article is transported by the ring 11 and the attached tray assembly 20 through a plurality of sort locations. When the tray reaches a preselected sort location, electrical control apparatus operates tip-up assembly 101 to tip the tray and deposit the article into a receiving apparatus such as 95, 96, 97 or 98.

Once the trays have been tipped, they are righted, or returned to their level position, by a stationary inclined cam located at appropriate points adjacent to ring 11. As shown in FIG. 2, only trays 21a and 21c have been tipped. These trays will remain in their tipped position until engagement with stationary cams 115 and 116, respectively, these cams serving to right the trays back into their level position prior to reloading of the trays for further sortation.

Accordingly, the circular sorter of this invention provides a sortation system by which articles in random mix fashion can be sorted into predetermined sorting locations for storage, shipping, classification or other purposes. The circular sortation apparatus disclosed herein has been found to be of substantially less cost than previous carrousel type sorters, particularly when utilized in the 10 foot to 60 foot diameter ranges. These cost savings are obtained from a number of features, including the elimination of chains and wheels from the carrousel type sorter, the elimination of internal arms or other bulky drive or take-up apparatus from prior sorters, and by the unique supporting and guiding assemblies which maintain the translating ring 11 in a substantially circular path and yet accommodate variations in the vertical attitude of the ring and in inaccuracies in the ring pitch due to the ring rolling and forming operation. The various features of a circular sortation conveyor described herein require no significant space within the ring. Thus, both load and sort locations can be disposed interiorly and exteriorly of the ring in a relative high density, in relation to the ring diameter, and the previous carrousel or rotary sorters of similar sort location capacity.

These and other advantages and modifications will become readily apparent to those of ordinary skill in the art without departing from the scope of this invention and the applicants intend to be bound only by the claims appended hereto.

We claim:

1. Article sorting apparatus comprising:
   movable circular ring means comprising a circular beam having a horizontal web and parallel, spaced inner and outer vertical side flanges on each side of said web, and extending above said web,
   circular frame means comprising at least curved beam segments underlying said ring means, said beam segments having a web wider than that of said circular beam of said ring means and also having inner and outer parallel spaced vertical flanges on each side of said wider web, and extending above said wider web,
   support means for engaging the web of said ring means and for rotationally supporting said ring means,
   guide means engaging a flange of said ring means for guiding said ring means,
   tiltable article carrying tray means mounted to said ring means and being tiltable selectively to one of the interior and exterior of said ring means, and
   means for selectively tilting said tray means to one of the interior and exterior of said ring means.

2. Apparatus as in claim 1 wherein said tray means are mounted to at least one of the vertical flanges of said circular beam and between the vertical flanges of said circular beam above said web thereof.

3. Apparatus as in claim 2 wherein said selective tilting means are mounted on said vertical flanges of said frame means beam segments.

4. Apparatus as in claim 3 wherein said frame means beam segments are discontinuous and said circular ring means is supported by roller means disposed between said segments.

5. Apparatus as in claim 4 wherein said roller means and adjacent ends of said segments are secured to support means.

6. Apparatus as in claim 4 wherein said supporting roller means are yieldably biased upwardly against said web of said circular beam.

7. Apparatus as in claim 1 wherein said vertical flanges of said beam segments overlap portions of said vertical flanges of said circular beam of said ring means.

8. Apparatus as in claim 1 including means for driving said circular ring means, said driving means comprising a frictional driving roller biased against one of said flanges of said circular beam of said ring means.

9. Apparatus as in claim 8 further including stationary rotatable idler rollers disposed against an opposite flange of said circular beam on an opposite side of said circular beam from said driving roller a distance approximately equal to the width of the web of said circular beam.

10. Apparatus as in claim 1 further including a plurality of means for receiving articles from selectively tiltable trays, said article receiving means being disposed both interiorly and exteriorly of said ring means.

11. Apparatus as in claim 10 wherein respective ones of said article receiving means are disposed interiorly and exteriorly of said ring directly opposite each other.

12. Article sorting apparatus comprising:
    movable circular ring means comprising a circular beam having a horizontal web and parallel, spaced inner and outer vertical side flanges on each side of said web,
    circular frame means comprising at least curved beam segments disposed beneath said ring means, said beam segments having a web wider than that of said circular beam of said ring means and also having inner and outer parallel spaced vertical flanges on each side of said wider web, said circular frame means underlying said ring means,
    support means rotatably supporting said ring means,
    tiltable article carrying tray means mounted to said ring means and being tiltable selectively to one of the interior and the exterior of said ring means,
    means for selectively tilting said tray means, and
    article receiving means disposed about said ring means both interiorly and exteriorly of said ring means and on opposite sides of said circular beam from each other whereby trays on said movable ring means selectively pass said opposite article receiving means in one of a level disposition, tilted toward the interior of said ring means, and tilted toward the exterior of said ring means.

13. Article sorting apparatus comprising:
    movable circular ring means comprising a circular beam having a horizontal web and parallel, spaced inner and outer vertical side flanges on each side of said web,
    circular frame means comprising at least curved beam segments disposed beneath said ring means, said beam segments having a web wider than that of said circular beam of said ring means and also having inner and outer parallel spaced vertical flanges on each side of said wider web, said beam segments underlying said ring means and the flanges of said curved beam segments overlapping portions of said inner and outer flanges, respectively, of said circular beam of said ring means,
    support means rotatably supporting said ring means,
    tiltable article carrying tray means mounted to said ring means and being selectively tiltable both interiorly and exteriorly of said ring means, and
    means for selectively tilting said tray means,
    said selective tilting means being mounted to at least one of said inner and outer flanges of said beam segments.

14. Apparatus as in claim 13 including selective tilting means mounted on said beam segment flanges directly opposite other tilting means at tray tilting locations, whereby trays on said ring means pass said opposite tilting means in one of a level disposition, tilted toward the interior of said ring means, and tilted toward the exterior of said ring means at said locations.

* * * * *